United States Patent
Blickberndt et al.

(10) Patent No.: US 7,239,863 B2
(45) Date of Patent: Jul. 3, 2007

(54) METHOD FOR REQUESTING A SUBSCRIBER COMMUNICATION TO A COMMUNICATION SYSTEM

(75) Inventors: Dirk Blickberndt, Grevenbroich (DE); Stephan Schaade, Buchlö (DE); Klaus Wille, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/491,038

(22) PCT Filed: Sep. 6, 2002

(86) PCT No.: PCT/DE02/03304

§ 371 (c)(1),
(2), (4) Date: Mar. 26, 2004

(87) PCT Pub. No.: WO03/032578

PCT Pub. Date: Apr. 17, 2003

(65) Prior Publication Data

US 2004/0242217 A1    Dec. 2, 2004

(30) Foreign Application Priority Data

Sep. 28, 2001  (DE) ............................ 101 47 896

(51) Int. Cl.
*H04M 1/66* (2006.01)
(52) U.S. Cl. .................. 455/411; 455/11.1; 455/410; 713/168
(58) Field of Classification Search ........... 455/411, 455/11.1, 558, 41, 410, 419; 713/168
See application file for complete search history.

(56) References Cited

U.S. PATENT DOCUMENTS

| | | | | | |
|---|---|---|---|---|---|
| 6,052,604 | A | * | 4/2000 | Bishop et al. | 455/558 |
| 6,466,781 | B1 | * | 10/2002 | Bromba et al. | 455/411 |
| 6,556,820 | B1 | * | 4/2003 | Le et al. | 455/411 |
| 6,615,057 | B1 | * | 9/2003 | Pettersson | 455/558 |
| 2003/0008612 | A1 | * | 1/2003 | Andreason | 455/11.1 |
| 2003/0033522 | A1 | * | 2/2003 | Bilgic et al. | 713/168 |

FOREIGN PATENT DOCUMENTS

| | | |
|---|---|---|
| DE | 195 48 394 A1 | 7/1996 |
| DE | 101 03 743 A1 | 8/2001 |
| WO | WO 99/09688 | 2/1999 |
| WO | WO 00/69186 | 11/2000 |
| WO | WO 01/67684 | * 9/2001 |
| WO | WO 01/67684 A2 | 9/2001 |

OTHER PUBLICATIONS

Jaap Hartson; Bluetooth—The Universal Radio Interface for ad hoc, Wireless Connectivity; Ericsson Review No. 3, 1998; pp. 110-117; Nr 3; Stockholm, SE.

(Continued)

*Primary Examiner*—Joseph Feild
*Assistant Examiner*—Phuoc Doan

(57) ABSTRACT

The invention concerns a method and a device for requesting subscriber communication to a communication system. Said communication system comprises a communication terminal having a first transmission/reception unit for a radio interface and a portable device having a second transmission/reception unit for the radio interface, for data exchange. Data concerning an authentication of the subscriber are exchanged through the radio interface. Once authentication is successfully completed, the subscriber request for communication with the communication system is granted.

16 Claims, 2 Drawing Sheets

OTHER PUBLICATIONS

Mechthild Allerbeck and Norbert Fischer; Mobile Kommunikation mit HICOM-Chipkarte, Telcom Report 9, 1996, Heft 4, pp. 270-276, Munchen, Germany.

Helmuth Lemme; "Chipkarten: Milliardengeschaft des 21. Jahrhunderts", Elektronik 13, 1996, pp. 45-52, Germany.

* cited by examiner

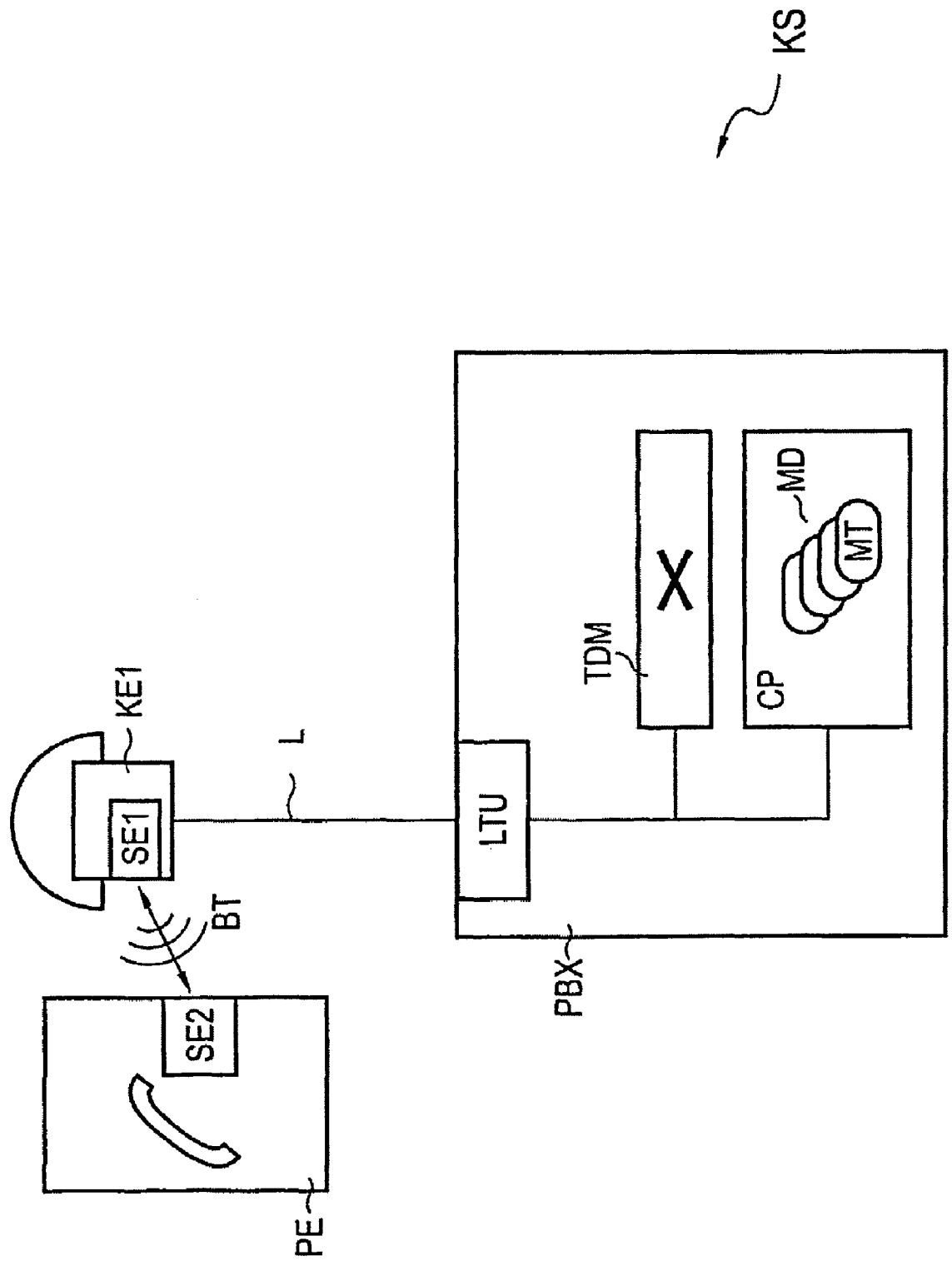

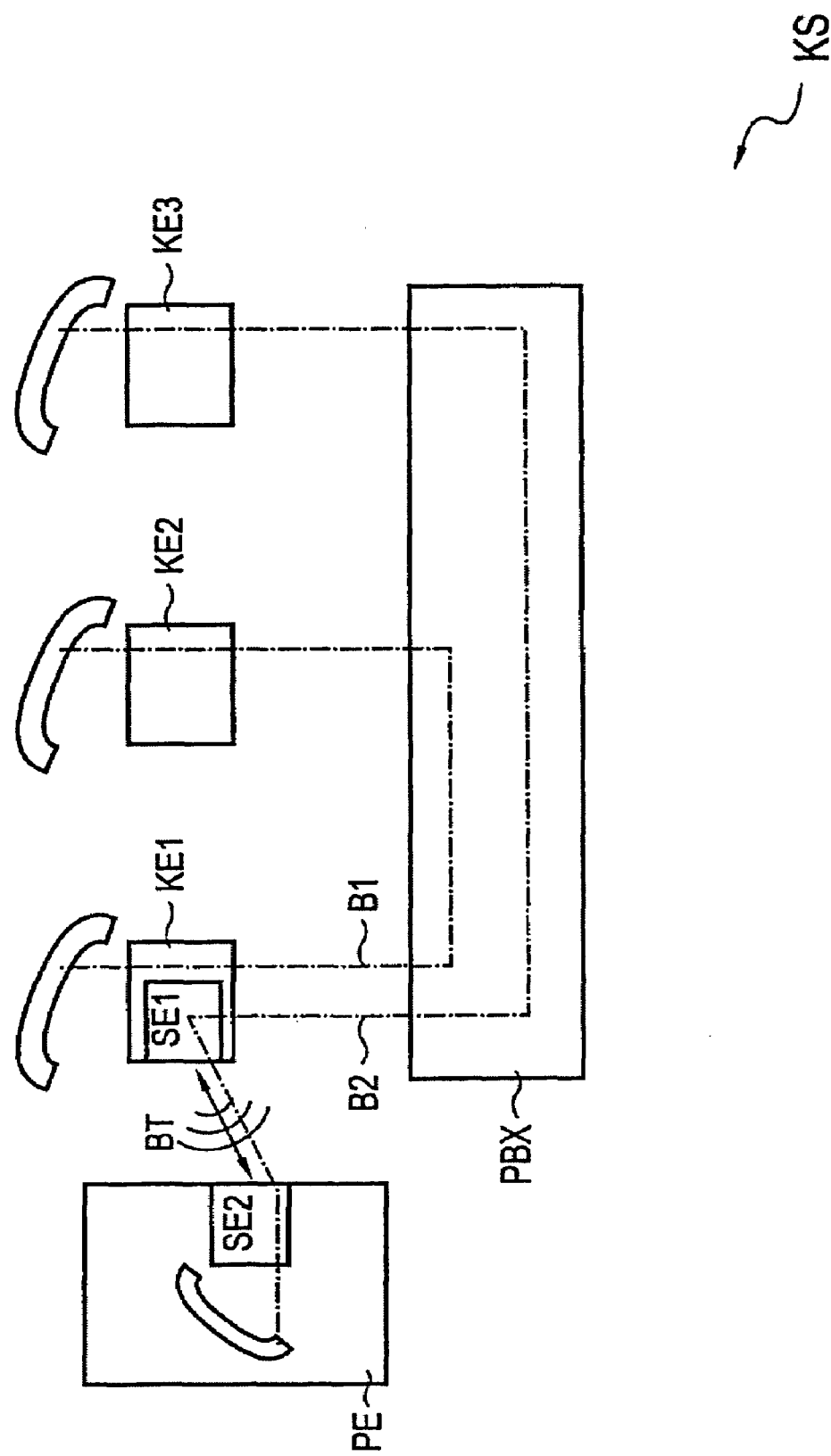

METHOD FOR REQUESTING A SUBSCRIBER COMMUNICATION TO A COMMUNICATION SYSTEM

CROSS REFERENCE TO RELATED APPLICATIONS

This application is the US National Stage of International Application No. PCT/DE02/03304, filed Sep. 6, 2002 and claims the benefit thereof. The International Application claims the benefits of German application No. 10147896.8 DE filed Sep. 28, 2001, both of the applications are incorporated by reference herein in their entirety.

FIELD OF INVENTION

The invention relates to a method for authentication of a mobile subscriber in accordance with the preamble of Patent Claim 1.

BACKGROUND OF INVENTION

In many communication systems a function is provided which allows a subscriber to individualize any given communication terminal within the communication system. In contemporary communication systems such a function is known as a "mobile subscriber in a communication system" service feature. This individualization is taken to mean that, after a request for communication process has been completed at the corresponding communication terminal, a subscriber has their personal authorization, specific functions of their membership of subscriber groups, their personal detailed billing and call charge assignment and also their personal service feature arrangements available to them. After the request for communication process has been completed at this terminal all calls directed to the mobile subscriber's number are put through to this terminal.

One requirement for this request for communication process is an identification of the mobile subscriber, which is made by entering a telephone number assigned to the mobile subscriber for example. A further component of the request for communication process is an authorization of the mobile subscriber, which is undertaken by a subsequent entry of a personal identification number ("PIN") for example. Instead of entry of the identification information and PIN many telecommunication terminals also support an authentication by means of a smart card belonging to the mobile subscriber.

There are known methods for a wireless communication terminal to request communication at a communication system. A method an means for setting up a cellular communication system using a number of local wireless networks is published in WO 00/69186 A1. In this a wireless unit is registered in the local wireless network by a switching station being found in the radio area of the wireless unit by running a polling and response system at regular intervals. Subsequently authorization information of the wireless unit is transferred to the switching station. After an identification and authentication of the wireless mobile unit this is registered with the communication system. This method naturally requires that the switching station is already registered in the communication, or as a fixed component of this communication system has no need for authorization.

WO 99/09688 A1 discloses a method and means for embodying a through connection path for a communication link in which a first signaling connection between a mobile communication terminal and a wired communication terminal and, as a result, a second signaling connection between the wired communication terminal and a base station is embodied, with mobility-related signaling information being exchanged over the two signaling connections.

From DE 195 48 394 A1 a method is known for setting of preference information by a generator device, such as a memory card or a widely-available database for example.

From publication Allerbeck, M. et al.: "Mobile communication with the HICOM smart card", in: telecom report 9, 1986, Volume 4. Pages 270 to 273 a method for registering a subscriber at a communication system is known, with a communication terminal assigned to the communication system, which can be assigned to the subscriber through the registration as well as a smart card for transmitting data to authenticate the subscriber

SUMMARY OF INVENTION

One object of the invention is to specify a method of simplifying this request for communication process for a mobile subscriber while retaining a secure authentication.

The object is achieved by the features of patent claim 1 or 10.

In accordance with the invention the request for communication process comprises the exchange, over an air interface, of authentication information between the communication terminal and an individual portable device belonging to the subscriber.

A significant advantage of the method in accordance with the invention can be seen in the fact that it dispenses with the entry of authentication information which is long-winded and susceptible to errors or the tedious use of a smart card. Instead, the advantageous use of an air interface makes the request for communication process much simpler so that the mobile subscriber places their portable device in the vicinity of the air interface and the request for communication process proceeds without the need for any further action by the mobile subscriber. The air interface can be embodied here to support an optical exchange of data—e.g. over an infrared interface—or via an exchange of data in an invisible electromagnetic wavelength.

Advantageous developments of the invention are specified in the subclaims.

The use of portable devices which require authentication of the user to be put into operation provides an advantageous security for the mobile subscriber against misuse in the case of loss of the individual portable device assigned to them. Typical portable devices requiring an authentication of the user to put them into operation are mobile computers such as notebooks, PDAs (Personal Digital Assistant), mobile communication terminals etc. These types of portable units are carried around almost all the time by a growing number of people, and the fact that they require authentication to be put into operation offers greater authentication security for mobile subscribers.

An advantageous embodiment of the air interface in accordance with the "Bluetooth" Standard produces an advantageous use of a standardized infrastructure which is increasingly employed for electronic devices with communication interfaces. In addition the use of Bluetooth enables data to be exchanged in the microwave range so that the design of the air interface is not restricted to placing the communication partners in immediate visible contact.

An especially advantageous embodiment of the invention is the equipping of the portable unit with functionalities of a mobile communication terminal. With this type of embodiment not only the authentication of the mobile subscriber, but also communication with the aid of the portable unit is guaranteed. In this way a mobile subscriber can, by carrying with them a mobile telephone—e.g. equipped with a GSM interface and a Bluetooth interface—move around as they please within a communication system designed in accordance with the invention, e.g. at a workstation of a person having a communication terminal embodied in accordance with the invention, at which they can advantageously request communication, without entering authorization information or using a smart card. Advantageously this mobile subscriber can use their mobile telephone instead of the communication terminal of the other person for incoming or outgoing communication connections.

With the advantageous use of two basic channels for exchanging payload data of the communication terminal with a communication unit both the mobile subscriber and also the subscriber with the communication terminal can communicate simultaneously.

BRIEF DESCRIPTION OF THE DRAWINGS

An exemplary embodiment of the invention is explained in more detail below on the basis of the drawing.

The diagrams show:

FIG. 1: a structure diagram for schematic representation of a communication system in accordance with the invention; and FIG. 2: a structure diagram for schematic representation of communication in the communication system in accordance with the invention.

DETAILED DESCRIPTION OF INVENTION

FIG. 1 shows a communication system KS with a communication unit PBX, a communication terminal KE1 and a portable unit PE communicating over an air interface BT with the communication terminal KE1. The communication system operates for example in accordance with a standard known to experts as ISDN (Integrated Services Digital Network).

There is bidirectional data transmission over the air interface BT between a first transceiver unit SE assigned to the communication terminal KE1 I and a second transceiver unit SE1 assigned to the portable unit PE. As in the exemplary embodiment, this air interface can be designed in accordance with an embodiment familiar to the expert as the Bluetooth Standard as a radio interface or also in accordance with an embodiment familiar to the expert as the IrDA Standard (Infrared Data Association) as an optical interface.

The communication device PBX operates in accordance with a time-slot-oriented switching principle—often referred to among experts as "Time Division Multiplex", TDM—and accordingly has a corresponding TDM switching matrix. A Line L of the communication terminal KE1 transmitting payload or signaling information is connected via a Line/Trunk Unit LTU assigned to the communication device PBX to the switching matrix TDM or to a coordination processor CP—a further central component of the communication device PBX.

Signaling information corresponds to data which, with an ISDN connection for example, is transmitted over what is referred to as a D channel—not shown—and contains data for connection control, signaling etc. A further component of the data exchanged between the communication terminal KE1 and the switching device PBX is the payload information which contains voice and/or video communication data for example. In an ISDN communication system KS this payload information is transmitted over one or more B channels—not shown.

In the ISDN-based communication system KS the communication unit KE1 is linked via the line L with two B channels to the line/trunk unit.

In the coordination processor CP a number of software functional modules MD—for handling connection control, service feature processes and such like—are administered. A service feature "mobile subscriber in a communication system" which can be called up in a communication system KS is processed in the coordination processor CP by calling the software module Mobile Subscriber MT.

A mobile subscriber carrying the portable unit PE with them is located in the vicinity of the communication terminal KE1. The portable unit PE is for example realized in an embodiment as a mobile communication terminal or also as a Personal Digital Assistant (PDA).

In the present exemplary embodiment the portable unit PE includes functionalities of a mobile communication terminal. As shown by the handset symbol as an element of the portable unit PE in the drawing, these functionalities also include provision of an audible input and output of information.

The sequence of a process for requesting communication by the mobile subscriber at the communication system KS is described below.

By pressing an input element—not shown—on their portable unit PE or on the communication terminal KE1, the mobile subscriber activates the service feature "Mobile subscriber in a communication system". In the portable unit PE a request containing subscriber identification and authorization data is then generated automatically. This request is transferred over the air interface BT to the communication terminal KE1 and sent as signaling information over the line L to the coordination processor CP. In the coordination processor CP the software module Mobile Subscriber MT is called, which uses the identification and authorization data transmitted from a portable unit to check authorizations of the mobile subscriber in the communication system KS. After the authenticity of the mobile subscriber is ensured, their personal authorizations, specific functions of their membership of subscriber groups, their personal detailed billing and call charge recording assignment as well as their personal service feature arrangements are created at the communication terminal KE1. In addition all calls directed to the mobile subscriber's number are put through to this communication terminal KE1. FIG. 2 shows a communication system KS with the communication device PBX, the communication terminal KE1 and the portable unit PE communicating over an air interface BT with the communication terminal KE1. The first communication terminal KE1 is linked by a first communication connection B1 to a second communication terminal KE2. In addition to this first communication link B1—shown as a dashed line—a second communication link B2—shown as a dashed line—is switched via the two B channels available at the first communication terminal KE1 between the first communication terminal KE3 and a third communication terminal KE3 through the communication device PBX. At the first communication terminal KE1 the payload data belonging to this second communication connection B2 is exchanged over the air interface BT with the portable unit PE.

By connecting the first communication terminal KE1 to the communication unit PBX via two radio channels the portable unit PE is thus available independently of a use of the first communication terminal KE1 for incoming or outgoing communication connections B2.

If the communication terminal KE1 in a further form of embodiment—not shown—is only connected via one channel to the communication unit PBX, the first communication terminal KE1 is blocked during an existing communication connection B2 of the portable unit PE for incoming or outgoing communication connections.

The invention claimed is:

1. A method of authenticating a portable subscriber unit with a communication system via a computer workstation, comprising:
assigning the computer workstation to the communication system, the computer workstation remote from and in communication with a central communication unit of the communication system and configured for serving as an intermediary interface between a portable subscriber unit in a local vicinity of the computer workstation and the central communication unit remote from the computer workstation; the computer workstation having a first transceiver unit for a local air interface assignable to the portable subscriber unit by the request for communication, the portable subscriber unit having a second transceiver unit to communicate with the computer workstation via the local air interface and having an input and/or output device;
sending data for an authentication of the portable subscriber unit over the local air interface from the portable subscriber unit to the computer workstation;
sending the authentication data from the computer workstation to the central communication unit of the communication system; and
registering the portable subscriber unit with the communication system after a successful authentication,
wherein the computer workstation is connected via a wire interface to the communication unit, the wire interface providing a first bearer channel and a second bearer channel.
wherein a communication between the central communication unit and the computer work station for a stationary subscriber uses the first bearer channel without using the air interface, and
wherein a communication between the central communication unit and the portable subscriber unit via the computer work station for a mobile subscriber uses the second bearer channel and uses the air interface.

2. The method in accordance with claim 1, wherein an authentication is required for placing the portable subscriber unit into operation.

3. The method in accordance with claim 1, wherein the local air interface is designed according to a Bluetooth Standard.

4. The method in accordance with claim 1, wherein the portable subscriber unit at least partly includes functionalities of a mobile communication terminal.

5. The method in accordance with claim 1, wherein after the request for communication to a communication system is completed a service feature "Mobile subscriber in a communication system" can be activated.

6. The method in accordance with claim 5, wherein after the service feature "Mobile Subscriber in a communication system" has been activated, calls directed to the mobile subscriber are put through to the computer workstation.

7. The method in accordance with claim 6, wherein communication between the mobile subscriber and a further calling or called subscriber, signaling and/or payload data is exchanged over the local air interface between the portable subscriber unit and the computer workstation.

8. The method in accordance with claim 7, wherein communication is undertaken via units of the portable subscriber unit.

9. The method in accordance with claim 1, wherein the bearer channel allows a transmission selected from the group consisting of voice, video, and data.

10. The method in accordance with claim 1, wherein the local air interface is a short-range wireless interface.

11. A method of authenticating a portable subscriber unit with a communication system via a subscriber communication terminal, comprising:
providing a first transceiver unit to the portable subscriber unit for communication between the portable subscriber unit and the terminal via a local air interface, the local air interface being a short-range wireless interface;
providing a second transceiver unit to the terminal for communication between the portable subscriber unit and the terminal via the local air interface, the portable subscriber unit in a local vicinity of the terminal,
providing a line interface for communication between the terminal and the central communication system;
assigning the terminal to the communication system;
sending data for an authentication of the portable subscriber unit over the local air interface from the portable subscriber unit to the terminal;
sending the authentication data from the terminal to the communication system; and
registering the portable subscriber unit with the communication system after a successful authentication,
wherein a transmission between the terminal and the communication system for a stationary subscriber is transmitted via the line interface without using the local air interface, and.
wherein a transmission between the portable subscriber unit and the communication system for a mobile subscriber is transmitted via the line interface and the local air interface.

12. The method in accordance with claim 11, wherein the terminal is connected to the central communication unit via a plurality of bearer channels allowing the portable subscriber unit to be communicatively connected to the central communication unit for the mobile subscriber at a same time that the terminal is communicatively connected to the central communication unit for the stationary subscriber.

13. The method in accordance with claim 12, wherein the bearer channel provides a transmission that does not include signaling information.

14. The method in accordance with claim 12, wherein the transmission is selected from the group consisting of voice, video, and data.

15. The method in accordance with claim 11, wherein the terminal is connected to the central communication unit via a single bearer channel, such that, when the central communication unit is communicatively connected to the terminal for the stationary subscriber using the single bearer channel, the communication connection between the portable subscriber unit and the central communication unit is blocked for the mobile subscriber.

16. The method in accordance with claim 11, wherein the terminal is connected to the central communication unit via a single bearer channel, such that, when the central communication unit is communicatively connected to the portable subscriber unit for the mobile subscriber using the single bearer channel, the communication connection between the terminal and the central communication unit is blocked for the stationary subscriber.

* * * * *